United States Patent [19]

Wiggers

[11] Patent Number: 4,632,620
[45] Date of Patent: Dec. 30, 1986

[54] APPARATUS FOR STACKING PALLETS ON WHICH ARTICLES, PREFERABLY LARGE SACKS, HAVE BEEN DEPOSITED

[75] Inventor: Winfried Wiggers, Rheine, Fed. Rep. of Germany

[73] Assignee: Windmoller & Holscher, Lengerich of Westphalia, Fed. Rep. of Germany

[21] Appl. No.: 732,257

[22] Filed: May 9, 1985

[30] Foreign Application Priority Data

May 14, 1984 [DE] Fed. Rep. of Germany ....... 3417876

[51] Int. Cl.⁴ ............................................. B65G 57/30
[52] U.S. Cl. ...................................... 414/95; 187/9 R; 414/674
[58] Field of Search .................. 414/70, 84, 85, 92, 414/95, 96, 674, 127; 187/9 R

[56] References Cited

U.S. PATENT DOCUMENTS

| | | | |
|---|---|---|---|
| 3,055,514 | 9/1962 | Dale et al. | 414/95 X |
| 3,069,050 | 12/1962 | Brettrager | 414/127 X |
| 3,295,703 | 1/1967 | Schiepe | 414/85 X |
| 3,666,052 | 5/1972 | Anderson et al. | 187/9 R |
| 3,833,132 | 9/1974 | Alduk | 414/84 |
| 3,884,366 | 5/1975 | Leenaards | 414/95 X |
| 3,904,045 | 9/1975 | Thibault | 414/96 X |
| 4,212,579 | 7/1980 | Strömberg | 414/95 |
| 4,352,616 | 10/1982 | Brenner | 414/84 X |

FOREIGN PATENT DOCUMENTS

| | | | |
|---|---|---|---|
| 3122720 | 1/1983 | Fed. Rep. of Germany | 414/674 |
| 2450220 | 10/1980 | France | 414/96 |

*Primary Examiner*—Leslie J. Paperner
*Attorney, Agent, or Firm*—Fleit, Jacobson, Cohn & Price

[57] ABSTRACT

Apparatus for stacking articles, particularly pallets on which articles having a substantially flat surface, preferably large sacks, have been deposited, the apparatus includes spaced apart parallel tines, which constitute lifting arms and are adapted to extend under the pallets or into openings thereof and are mounted on a slide, which is movable in vertical tracks and adapted to be lifted and lowered by a drive device. The vertical tracks are connected to a stationary base frame. The tines are extensible and retractable and guided in tracks of the slide. A conveyor for the articles to be stacked is disposed below the tines when they have been extended.

7 Claims, 2 Drawing Figures

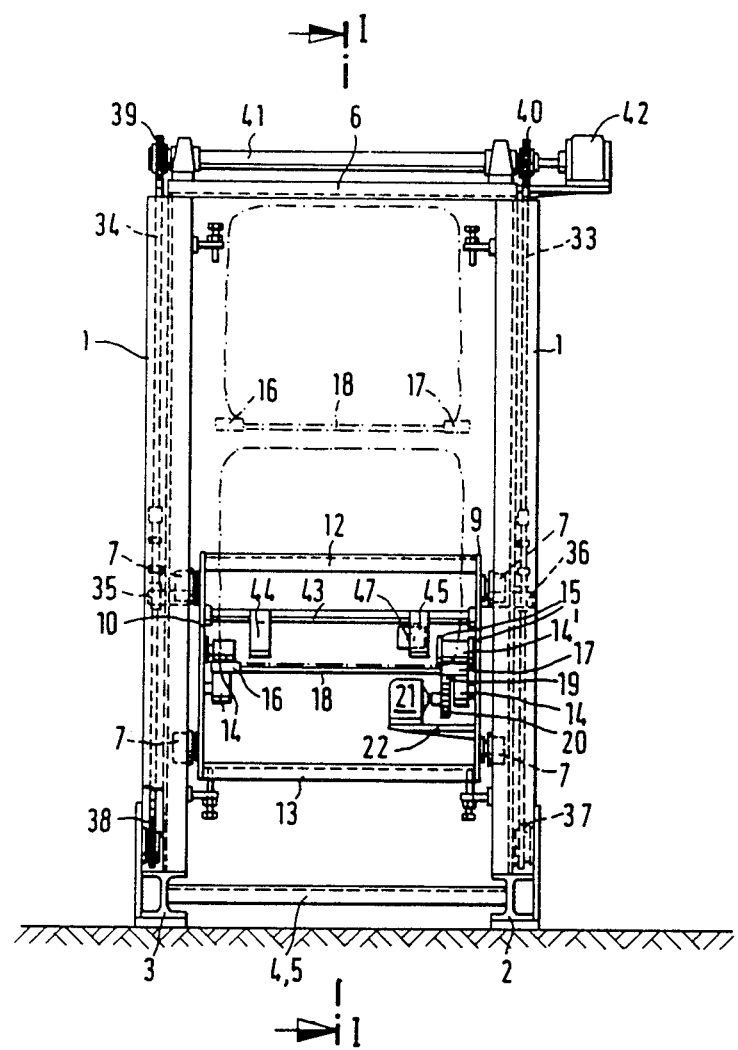

APPARATUS FOR STACKING PALLETS ON WHICH ARTICLES, PREFERABLY LARGE SACKS, HAVE BEEN DEPOSITED

BACKGROUND OF THE INVENTION

1. Field of the Invention

This invention relates to apparatus for stacking pallets on which articles having a substantially flat surface, preferably large sacks, have been deposited, comprising spaced apart parallel tines, which constitute lifting arms and are adapted to extend under the pallets or into openings thereof and are mounted on a slide, which is movable in vertical tracks and adapted to be lifted and lowered by drive means.

2. Description of the Prior Art

Known apparatus of that kind consist of fork lift trucks in which the tines are secured to a fork carrier, which is secured to a lifting frame that is guided in a mast and is adapted to be lifted and lowered. Fork lift trucks are used, e.g., to carry and transport articles which have been deposited on pallets. For an economical operation of fork lift trucks, the stacks transported by the fork lift trucks should be as high as is consistent with the stability of the stacks. The operation of fork lift trucks to form higher stacks from juxtaposed articles deposited on pallets in that said pallets are stacked on each other is a time-consuming work, which can be carried out only with difficulty particularly if such articles become available at a high rate in production or processing operations, as is the case, e.g., with filled large sacks which come from a filling and closing machine and have been deposited on pallets.

SUMMARY OF THE INVENTION

It is an object of the invention to provide apparatus which is of the kind described first hereinbefore and by which articles deposited on pallets can be stacked in a simple and economical manner to form stacks which can be transported.

In apparatus of the kind described first hereinbefore that object is accomplished in accordance with the invention in that the vertical tracks are connected to a stationary base frame, the tines are extensible and retractable and guided in tracks of the slide, and a conveyor for the articles to be stacked is disposed below the tines when they have been extended. The apparatus in accordance with the invention can be used in a simple manner to form transportable stacks of two articles deposited on pallets in that one pallet is raised and another pallet is conveyed under the raised one, which is subsequently deposited onto the subsequently conveyed pallet.

A satisfactory stacking cannot be performed unless the tines can be retracted from or out of the pallet substantially without friction when the raised pallet has been deposited on the lower one because such friction might result in a slipping of the stack. Within the scope of the invention, at least one of the tines is provided with a feeler for detecting a deflection of the tine under load. That feeler generates a signal or disables the means for retracting the tines until the load on the tines has been reduced below a value which might involve an appreciable friction between the tines and the pallet.

The feeler suitably comprises a feeler lever, which is pivoted at one end to the slide and is supported on one tine through the intermediary of a roller, and a switch is provided, which is adapted to be actuated by the other end of the lever when the same has been pivotally moved. The roller may be mounted on the lever itself.

Each tine may be guided between two spaced apart pairs of rollers, which are rotatably mounted in the slide, and the roller for pivotally moving the feeler lever may bear on the top surface of one tine between the two associated pairs of rollers. That top surface will be upwardly defected when a load is applied to protruding tines which have been extended.

The conveyor on which the stacks are formed may consist of a roller conveyor, which comprises rollers provided with drive means. When the stack has been formed the stacked articles may be removed from said roller conveyor by a succeeding conveyor or by fork lift trucks.

The slide is suitably provided with extensible or pivotally movable abutments, which are engageable with the pallets as the tines are retracted.

BRIEF DESCRIPTION OF THE DRAWING

FIG. 2 is a front elevation showing the stacking apparatus of FIG. 1.

DETAILED DESCRIPTION OF THE PREFERRED EMBODIMENT

Figure 1:
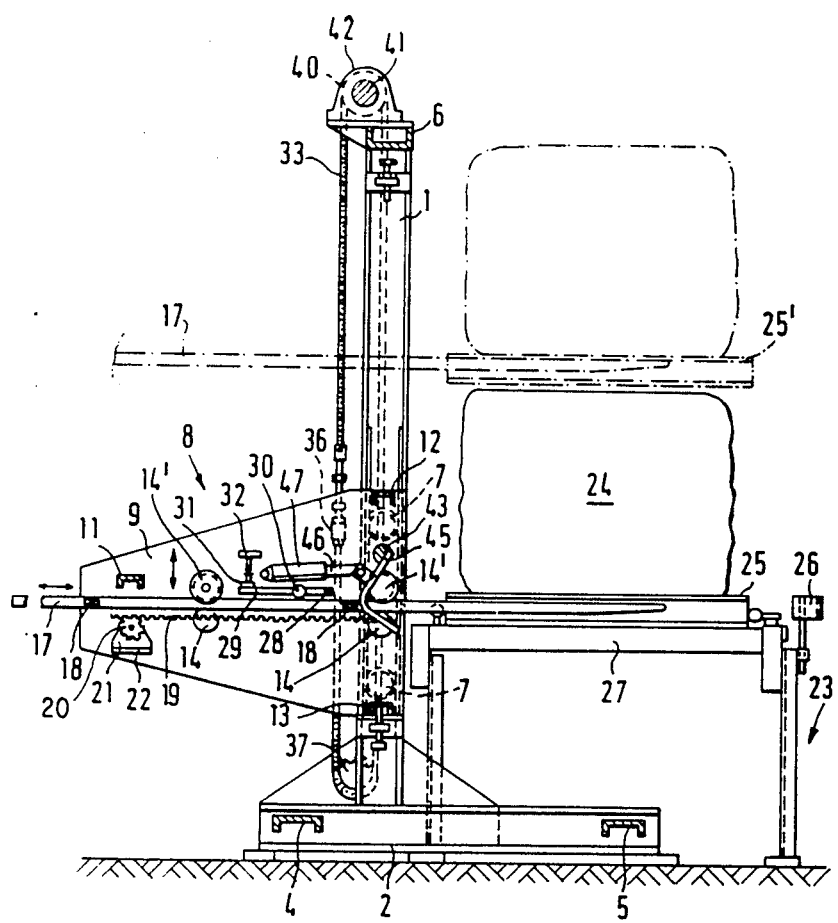
FIG. 1 is a side elevation showing the stacking apparatus.

An illustrative embodiment of the invention will now be described more in detail with reference to the drawing.

Two laterally disposed, upright channel members 1 having confronting open sides stand on two I sections 2, 3, which are interconnected by two crossbeams 4 and 5. The upper portions of the channel members are also interconnected by a crossbeam 6. The channel members 1 constitute tracks for guide rollers 7, which are connected to a slide 8, which is adapted to be raised and lowered. The slide 8 consists of two profiled side plates 9 and 10, which are interconnected by three crossbeams 11, 12 and 13.

Upper and lower guide rollers 14, 14' are rotatably mounted in the profiled side plates 10. The guide roller 14' is provided at opposite ends with annular flanges 15. The guide rollers 14, 14' support two lifting arms 16 and 17, which are rigidly interconnected by two profiled cross members 18. Each of the lifting arms 16 and 17, which are rectangular in cross-section, extends between and is guided by the flanges 15 of the associated guide roller 14' so that the lifting arms cannot be laterally deflected.

A rack 19 is welded to the lifting arm 17 and meshes with a gear 20, that is non-rotatably connected to the shaft of a motor 21. The latter is mounted on a bracket 22, which is secured to the profiled plate 9. It is apparent that the motor 21 is operable to move the lifting arms 16 and 17 to the position shown in FIG. 1 and to a retracted position, not shown.

As is particularly apparent from FIG. 1, the stacking apparatus is preceded by a closely spaced apart roller conveyor 23, by which individual filled large sacks 24 standing on respective pallets 25 can be supplied to the stacking apparatus. The correct positioning of each pallet 25 relative to the lifting arms 16 and 17 is ensured by two photocells 26, which cause the conveyor rollers 27 to be driven until a pallet 25 is disposed exactly between the two photocells 26. For this purpose the conveyor rollers 27 may also be reversely driven if the kinetic energy of a pallet 25 has caused the latter to overrun the photocells 26.

When a pallet 25 loaded with a sack 24 has been moved to a position in front of the stacking apparatus (that position is indicated with solid lines in FIG. 1), the motor 21 is operated so that the lifting arms 16 and 17 move into or under the pallet 25. The extending movement of the lifting arms is limited by a limit stop, not shown.

When this has been complished the slide 8 is raised until the pallet 25 has reached the position indicated by dotted lines in FIG. 1. The slide 8 remains in that position until another pallet has been moved to a position under the pallet which has been raised. When this has been accomplished, the slide 8 is lowered until the lifting arms 16 and 17 have been relieved and can be retracted from the raised pallet.

In order to detect the relief of the lifting arms 16 and 17, a lever 29 is pivoted on a pin 28, which is secured to the profiled side plate 9. That lever 29 carries a roller 30, which is supported by the lifting arm 17. As soon as a load has been applied to the lifting arms 17, the latter will be deflected so that the roller 30 is raised about the pin 28 and the lever 29 is also pivotally raised about the pin 28. The lever 29 is provided at its free end with a switching cam 31 for actuating a switch 32. For the sake of convenience that mechanism for measuring the deflection of the lifting arm 17 is shown only in FIG. 1.

The position in which the lifting arms 16 and 17 can be retracted from the raised and subsequently lowered pallet must be exactly determined because the slide 8 is adapted to be raised and lowered by means of two chains 33 and 34, each of which is fixed at opposite ends to one of the pins 35 and 36 carried by the slide 8. The two chains 33 and 34 are trained around lower chain sprockets 37 and 38, respectively, and around upper chain sprockets 39 and 40, respetively. The upper chain sprockets 39 and 40 are secured to a shaft 41, which can be driven by a motor 42.

The arrangement for driving the slide 8 ensures a smooth movement, which could not be ensured if the slide were mounted only on one chain.

The upper and lower end positions of the slide 8 can be exactly determined by limit switches. But the position in which a previously raised pallet has been deposited on a filled sack moved to a position under said pallet cannot always be exactly predetermined because the level to which the sack is filled may differ for different sacks. To permit an exact determination of that position, the above-described mechanism for detecting a deflection of the lifting arm 17 is provided. That deflection will be zero when a previously raised pallet has been deposited onto a sack moved to a position under that pallet. That zero deflection will be indicated by the mechanism 28 to 32. The indication of zero deflection constitutes also a command for retracting the lifting arms from the raised pallet and for subsequently lowering the slide 8 to its initial position.

As is apparent from FIGS. 1 and 2 the two profiled plates 9 and 10 are interconnected also by a rotatable shaft 43, which carries two angled restraining arms 44 and 45. The arm 45 is connected to the piston rod 46 of a piston-cylinder unit 47, which can be actuated to impart a pivotal movement to the restraining arms 44 and 45 so that they engage a raised pallet 25' at its sides facing the restraining arms 44 and 45. This arrangement will ensure that a raised pallet will not be shifted as the lifting arms 16 and 17 are retracted from that pallet.

I claim:

1. Apparatus for stacking articles, particularly pallets on which articles having a substantially flat surface, preferably large sacks, have been deposited, comprising: spaced apart parallel tines, which constitute lifting arms and which are adapted to extend under the pallets or into openings thereof and are mounted on a slide, which is movable in vertical tracks and adapted to be lifted and lowered by drive means, wherein the vertical tracks are connected to a stationary base frame, the tines are extensible and retractable and guided in guide means at longitudinally spaced positions relative to a tine and supported on a slide, and deflection sensing means carried by the slide and positioned above and in contact with at least one of the tines between the guide means for detecting deflection of an intermediate portion of the at least one tine under load, and a conveyor for the articles to be stacked is disposed below the tines when they have been extended.

2. Apparatus according to claim 1, wherein the deflection sensing means includes a lever pivoted at one end to the slide and contacting the at least one tine at an intermediate position between said guide means, and switch means positioned adjacent the other end of the lever and adapted to be actuated by the other end of the lever when the same has been pivotally moved as a result of deflection of the associated tine.

3. Apparatus according to claim 2, wherein said guide means includes pairs of rollers and each tine is guided between two spaced apart pairs of rollers, which are rotatably mounted in the slide, and said deflection sensing means includes a roller for pivotally moving the feeler lever and bears on the top surface of said at least one tine between the associated pairs of guide rollers.

4. Apparatus according to claim 1, wherein the conveyor includes a roller conveyor, which comprises rollers provided with drive means.

5. Apparatus according to claim 1, wherein the slide is provided with movable abutments, which are engageable with the pallets as the tines are retracted.

6. Apparatus according to claim 1, wherein the conveyor is adapted to move each pallet transversely to the direction in which said tines are adapted to be extended and retracted.

7. Apparatus according to claim 6, wherein the conveyor protrudes on opposite sides of the slide and is adapted to convey each pallet to a position in front of the slide from one side thereof and to convey each stack of pallets away from the slide on the other side thereof.

* * * * *